US 8,339,331 B2

(12) United States Patent
Momose

(10) Patent No.: US 8,339,331 B2
(45) Date of Patent: Dec. 25, 2012

(54) ELECTRO-OPTICAL DEVICE AND ELECTRONIC APPARATUS

(75) Inventor: Yoichi Momose, Matsumoto (JP)

(73) Assignee: Epson Imaging Devices Corporation (JP)

( * ) Notice: Subject to any disclaimer, the term of this patent is extended or adjusted under 35 U.S.C. 154(b) by 651 days.

(21) Appl. No.: 12/275,295

(22) Filed: Nov. 21, 2008

(65) Prior Publication Data

US 2009/0243961 A1    Oct. 1, 2009

(30) Foreign Application Priority Data

Mar. 27, 2008 (JP) ................................. 2008-082824
Jul. 23, 2008 (JP) ................................. 2008-189450

(51) Int. Cl.
G09G 5/00 (2006.01)
(52) U.S. Cl. .......... 345/6; 345/4; 345/5; 345/32; 349/15
(58) Field of Classification Search .................. 345/1.3, 345/87; 349/141; 359/619
See application file for complete search history.

(56) References Cited

U.S. PATENT DOCUMENTS

| 7,154,653 | B2 | 12/2006 | Kean et al. | |
|---|---|---|---|---|
| 2005/0001787 | A1* | 1/2005 | Montgomery et al. | 345/6 |
| 2006/0061723 | A1* | 3/2006 | Mori et al. | 349/141 |
| 2007/0001953 | A1* | 1/2007 | Jang et al. | 345/88 |
| 2007/0058258 | A1* | 3/2007 | Mather et al. | 359/619 |
| 2007/0063941 | A1* | 3/2007 | Tanaka | 345/87 |
| 2007/0291172 | A1 | 12/2007 | Kouzimoto et al. | |
| 2009/0040426 | A1 | 2/2009 | Mather et al. | |

FOREIGN PATENT DOCUMENTS

| CN | 1534328 | 10/2004 |
|---|---|---|
| CN | 101048812 | 10/2007 |
| JP | 2005-078094 | 3/2005 |

* cited by examiner

*Primary Examiner* — Quan-Zhen Wang
*Assistant Examiner* — David Lee
(74) *Attorney, Agent, or Firm* — Harness, Dickey & Pierce, P.L.C.

(57) ABSTRACT

An electro-optical device including: first display elements each divided into at least a first region and a second region, for displaying a first image, and second display elements each divided into at least a third region and a fourth region, for displaying a second image, the first and second display elements being arranged such that each third region is disposed between the first region and the second region of the adjacent first display element and each second region is disposed between the third region and the fourth region of the adjacent second display element; a parallax barrier layer provided on a side of the display elements adjacent to a viewer, the parallax barrier having light transmitting regions at positions thereof corresponding to boundaries between adjoining first and third regions as well as between adjoining second and fourth regions; and a spacer layer separating the display elements from the parallax barrier layer.

27 Claims, 9 Drawing Sheets

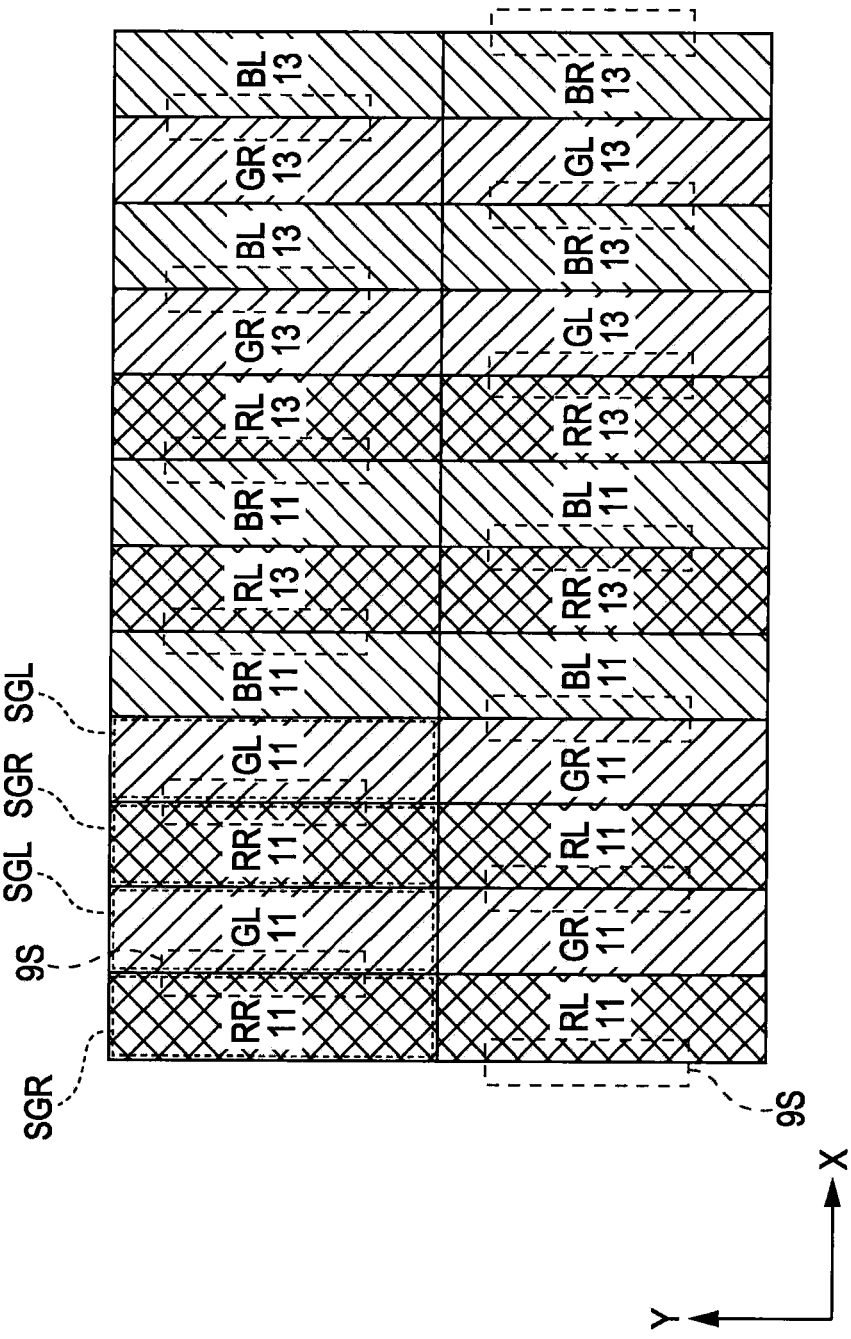

ELECTRO-OPTICAL DEVICE AND ELECTRONIC APPARATUS

BACKGROUND

1. Technical Field

The present invention relates to an electro-optical device and electronic apparatus suitably employed for displaying a variety of information. More specifically, the invention relates to an electro-optical device used as a two screen displaying device which shows different viewers at different viewing positions different images, or to an electro-optical device used as a three dimensional displaying device which displays a three dimensional image.

2. Related Art

Known examples of an electro-optical device include a two screen displaying device which provides different images for different viewers at different viewing positions and a three dimensional displaying device which displays a three dimensional image. An example of a display system of such kind of display device includes a parallax barrier system. For example, JP-A-2005-78094 discloses a visual display unit which has a liquid crystal display panel having two substrates, one of which is located closer to the viewers and provided with a parallax barrier disposed thereon. The parallax barrier has an array of vertically extending openings formed and arranged at predetermined positions thereof in a stripe pattern. For example, when a first and second images are provided for first and second viewers at different viewing positions, respectively, the openings in the parallax barrier are formed to allow the first viewer to see only the first image and the second viewer to see only the second image. Furthermore, in a display device which provides a three dimensional image for a viewer, openings in the parallax barrier are formed and arranged to allow the viewer to see an image for the left eye with the left eye and an image for the right eye with the right eye.

Incidentally, it is necessary to place the parallax barrier and a displaying element separated by a certain space from each other, whereby the different images are visible from different directions. Therefore, the display disclosed in JP-A-2005-78094 has a transparent layer such as of a resin located between the parallax barrier and an image-displaying layer.

However, the resin layer is required to have a thickness as large as 30 μm to 60 μm, according to the technology disclosed in JP-A-2005-78094. Such a large thickness tends to cause an unevenness of the resin layer, which may disadvantageously lead to a crosstalk. Here, the word "crosstalk" means leakage of light into one image from another image, which is due to various factors. For example, in a case where the first and second images are provided for the first and second viewers in different positions, respectively, the first viewer sees not only the first image but also part of the second image and the second viewer sees not only the second image but also part of the first image due to the occurrence of the crosstalk. In case of a display device for presenting a three dimensional image for a viewer, the viewer sees with the left eye not only an image for the left eye but also an image for the right eye. Likewise, the viewer sees with the right eye not only the image for the right eye but also part of the image for the left eye.

SUMMARY

An advantage of some aspects of the invention is that a crosstalk is reduced to improve display quality in an electro-optical device employing, for example, a parallax barrier system.

An electro-optical device according to the present invention includes: first display elements each divided into at least a first region and a second region, for displaying a first image, and second display elements each divided into at least a third region and a fourth region, for displaying a second image, the first and second display elements being arranged such that each third region is disposed between the first region and the second region of the adjacent first display element and each second region is disposed between the third region and the fourth region of the adjacent second display element; a parallax barrier layer provided on a side of the display elements adjacent to a viewer, the parallax barrier having light transmitting regions at positions thereof corresponding to boundaries between adjoining first and third regions as well as between adjoining second and fourth regions; and a spacer layer separating the display elements from the parallax barrier layer.

According to the electro-optical device described above, images displayed on the first and third regions are seen through the light transmitting regions provided at positions corresponding to the boundaries between them, and images displayed on the second and fourth regions are seen through the light transmitting regions provided at positions corresponding to the boundaries between them. Here, the third region is disposed between the first region and the second region, and the second region is disposed between the third region and the fourth region. Therefore the first image displayed on the first and second regions and the second image displayed on the third and fourth regions are seen from different directions. In the above described electro-optical device, each of the first display elements is divided into the first and second regions and each of the second display elements is divided into the third and fourth regions, whereby the minimum unit width of the display element is smaller than that of a display element without being divided. Therefore, it is possible to decrease a distance necessary for generating a parallax, i.e. the thickness of the spacer layer and, hence, the overall thickness of the electro-optical device.

Number of divisions are not limited to two. The larger the number of divisions becomes, the smaller the required thickness of the spacer layer becomes since the widths of the display regions becomes smaller. Material of the spacer layer is not limited as long as the spacer layer is light transmissive, for instance, a sheet of glass, a sheet of plastic, a transparent inorganic film, a transparent resin layer or the like being applicable. The present invention is particularly useful in a structure where an over-coating layer formed by coating resin is used as the spacer layer, because the greater thickness of over-coating layer tends to disadvantageously cause unevenness of the over-coating layer.

To obtain a proper parallax, the thickness of the spacer layer "dth" is set to be slightly larger than a pitch "pch" at which adjoining first and third regions are arranged or adjoining second and fourth regions are arranged. More particularly, the thickness dth and the arrangement pitch pch are set so that a formula $1.1 \leq dth/pch \leq 1.3$ holds. To apply the resin over coat with a constant thickness, it is preferable to set the thickness 20 μm. Therefore the arrangement pitch pch needs to be 18.2 μm or less. In other words, it is desirable to set the number of divisions of the first display element and the second display element to satisfy the condition of $pch < 18.2$ holds.

Also, slits can serve as the light transmitting regions, being provided along the boundaries between adjoining first and third regions as well as between adjoining second and fourth regions.

The electro-optical device may be applied to electro-optical devices capable of displaying color images in which a plurality of subpixels display different colors from each other to form a color pixel. In this case, the first display element or the second display element serves as one of a plurality of subpixels. The first display element and the second display element may correspond to colors different from each other or, alternatively, to an identical color.

Practically, the electro-optical device may be arranged such that, for example, each of the first display elements includes a first pixel electrode which is divided into a first pixel electrode segment and a second pixel electrode segment corresponding to the first region and the second region, respectively, the second pixel electrode segment being connected to the first pixel electrode segment, while each of the second display elements includes a second pixel electrode which is divided into a third pixel electrode segment and a fourth pixel electrode segment corresponding to the third region and the fourth region, respectively, the fourth pixel electrode segment being connected to the third pixel electrode segment.

In this practical example, it is preferable that a first switching element is connected to the first pixel electrode, a first data line is connected to the first switching element, a second switching element is connected to the second pixel electrode, a second data line is connected to the second switching element, and a common scanning line is connected to the first switching element and the second switching element. In this case, it is preferable that the first switching element is connected to each of the first pixel electrodes via the first pixel electrode segment, and the second switching element is connected to each of the second pixel electrodes via the fourth pixel electrode segment.

Also, it is desirable that the device contains a first substrate on which the parallax barrier layer and the spacer layer are laminated, a second substrate facing the first substrate, and an electro-optical material layer sealed between the first substrate and the second substrate. For example, a liquid crystal layer may be used as the electro-optical material layer. The first pixel electrode and the second pixel electrode are formed preferably on the second substrate. A color layer may be formed on the first substrate in addition to the parallax barrier layer and the spacer layer. Furthermore, electro-optical device may be provided with a lightning unit emitting light toward the second substrate.

BRIEF DESCRIPTION OF THE DRAWINGS

The invention will be described with reference to the accompanying drawings, wherein like numbers reference like elements.

FIG. 5 is a schematic diagram illustrating a composite image formed from two images.

DESCRIPTION OF EXEMPLARY EMBODIMENTS

Embodiments of the invention will now be described in detail hereinafter with reference to the accompanying drawings.

(Liquid Crystal Device)

Figure 1:
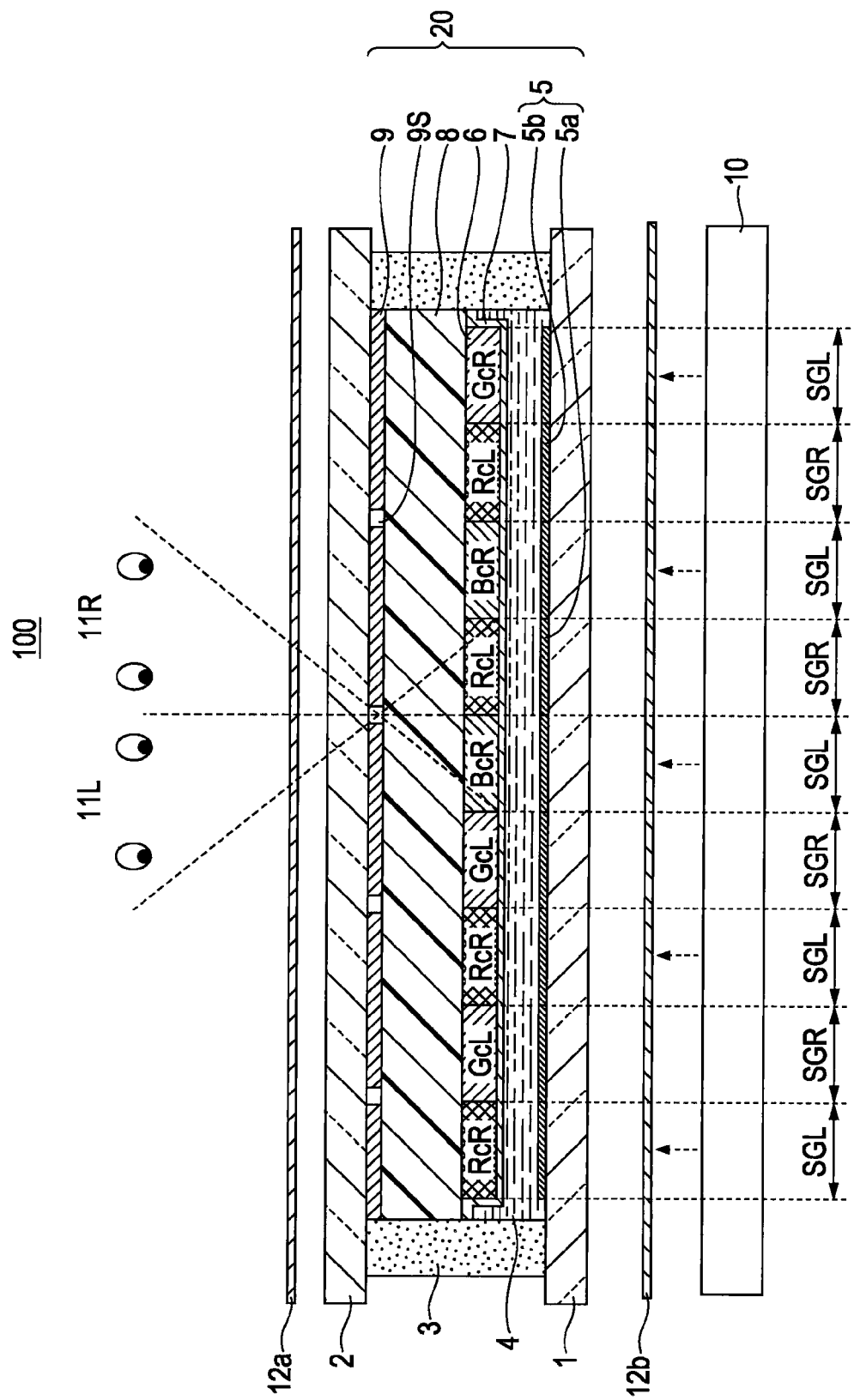
FIG. 1 is a sectional view of a liquid crystal device according to an embodiment.

FIG. 1 is a sectional view of a liquid crystal device 100 as an electro-optical device according to an embodiment. The liquid crystal device 100 is a visual display unit which employs a parallax barrier system. The liquid crystal device 100 performs, for example, two-screen display for displaying different images to a plurality of viewers at different view positions or three dimensional display for displaying three dimensional images. In the following description, the liquid crystal device 100 is assumed to perform the two-screen display for the sake of convenience of illustration.

As shown in FIG. 1, the liquid crystal device 100 according to the embodiment mainly includes a liquid crystal display panel 20 and a lighting unit 10.

The liquid crystal display panel 20 is configured such that a substrate 1 and a substrate 2 are adhered to each other through a sealing member 3 placed therebetween. The inner space between the substrates 1 and 2 is filled with liquid crystal 4 as an electro-optical material. The substrate 1 has a plurality of pixel electrodes 5 disposed on the inner surface adjacent to the liquid crystal 4. Each pixel electrode 5, a counter electrode 7 and the liquid crystal 4 filled therebetween form a display element. Each of the pixel electrodes 5 is divided into two regions corresponding to pixel electrode segments 5a and 5b. These electrode segments 5a and 5b in combination form a single pixel electrode 5 and are connected to each other to receive common image data. There is an RGB color layer formed with R (red) layer component, G (green) layer component and B (Blue) layer component, each of the color layer components being disposed at a position corresponding to one of the pixel electrodes 5. A set of RGB layer components together with the associated pixel electrodes 5 forms a color pixel. In other words, each pixel electrode 5 is one of subpixel electrodes which are constituents of one color pixel. More specifically, referring to FIG. 1, each set of two pixel electrode segments forms the associated subpixel electrode: namely, the pair of pixel electrode segments for the color layer component RcR correspond to a single subpixel, and the pair of pixel electrode segments for the color layer component GcL correspond to another single subpixel. Similarly, the pair of pixel electrode segments for the color layer component BcR correspond to a different single subpixel, and the pair of pixel electrode segments for the color layer component RcL correspond to a further different single subpixel.

Sequentially formed on the inner surface of the substrate 2 are a parallax barrier 9, an over-coating layer 8 as a spacer layer, a color layer 6 configured with the RGB layer components and serving as a color filter, and a counter electrode 7.

The RGB layer components of the color layer 6 are disposed locally at positions corresponding to the pixel electrode segments 5a and 5b, and the counter electrode 7 is formed over the inner surface of the substrate 2.

The lighting unit 10 is disposed behind the liquid crystal display panel 20. The lighting unit 10 emits light, causing the light to pass through the liquid crystal display panel 20 thereby illuminating the liquid crystal display panel 20. A rear polarizing plate 12b is disposed between the liquid crystal display panel 20 and the lighting unit 10 and a front polarizing plate 12a is disposed on a light emitting side of the liquid crystal display panel 20.

The parallax barrier 9 has slits 9S disposed therein at a predetermined interval, each of the slits 9S serving as a light transmitting region. Only the slits 9S in the parallax barrier 9 function as the light transmitting regions which transmit the light, and the parallax barrier 9 itself functions as a light shielding region which blocks the light. The slits 9S are positioned in alternate regions corresponding to boundaries between the successive adjacent color layer components. More specifically, the slits 9S are arranged so that the color layer components disposed on both sides of any slit 9S carry different colors.

The over-coating layer 8 is provided between the parallax barrier 9 and the color layer 6, and is formed from, for example, acrylic resin. The over-coating layer 8 has a function to separate the parallax barrier 9 and the liquid crystal 4 by a certain distance, so as to enable viewers 11R and 11L at different viewing positions to observe different images.

The light emitted from the lighting unit 10 is incident on the liquid crystal display panel 20, transmitted through the color layer 6, passed through the slits 9S, and then emitted from the liquid crystal display panel 20. The light emitted from the liquid crystal display panel 20 is incident on the eyes of a plurality of viewers 11R and 11L at different viewing positions.

In the liquid crystal device 100 shown in FIG. 1, the color layer components of the color layer 6 which transmits the light to be incident on the eyes of the viewer 11R are represented by the color layer components RcR, GcR and BcR, and the color layer components which transmits the light to be incident on the eyes of the viewer 11L are represented by the color layer components RcL, GcL and BcL (BcL is not shown in the figure). Here, two pixel electrode segments corresponding to two color layer components RcR are connected to each other, two pixel electrode segments corresponding to two color layer components GcR are connected to each other, and two pixel electrode segments corresponding to two color layer components BcR are connected to each other. Thus, each set of two color layer components RcR forms a subpixel SGR. Similarly, each set of two color layer components BcR forms another subpixel SGR, and each set of two color layer components GcR (only one GcR is shown in the figure) forms a different subpixel SGR. The light seen by the viewer 11R is emitted through these subpixels SGR. Likewise, each set of two color layer components RcL forms another subpixel SGL, and each set of two color layer components GcL and two color layer components BcL (BcL is not shown in the figure) forms a different subpixel SGL. The light seen by the viewer 11L is emitted through these subpixels SGL.

For example, the light passing through the color layer component BcR travels through the slit 9S located in the position corresponding to a boundary between the color layer component BcR and the color layer component RcL, being incident on the eyes of the viewer 11L as indicated by dashed lines.

Figure 2:
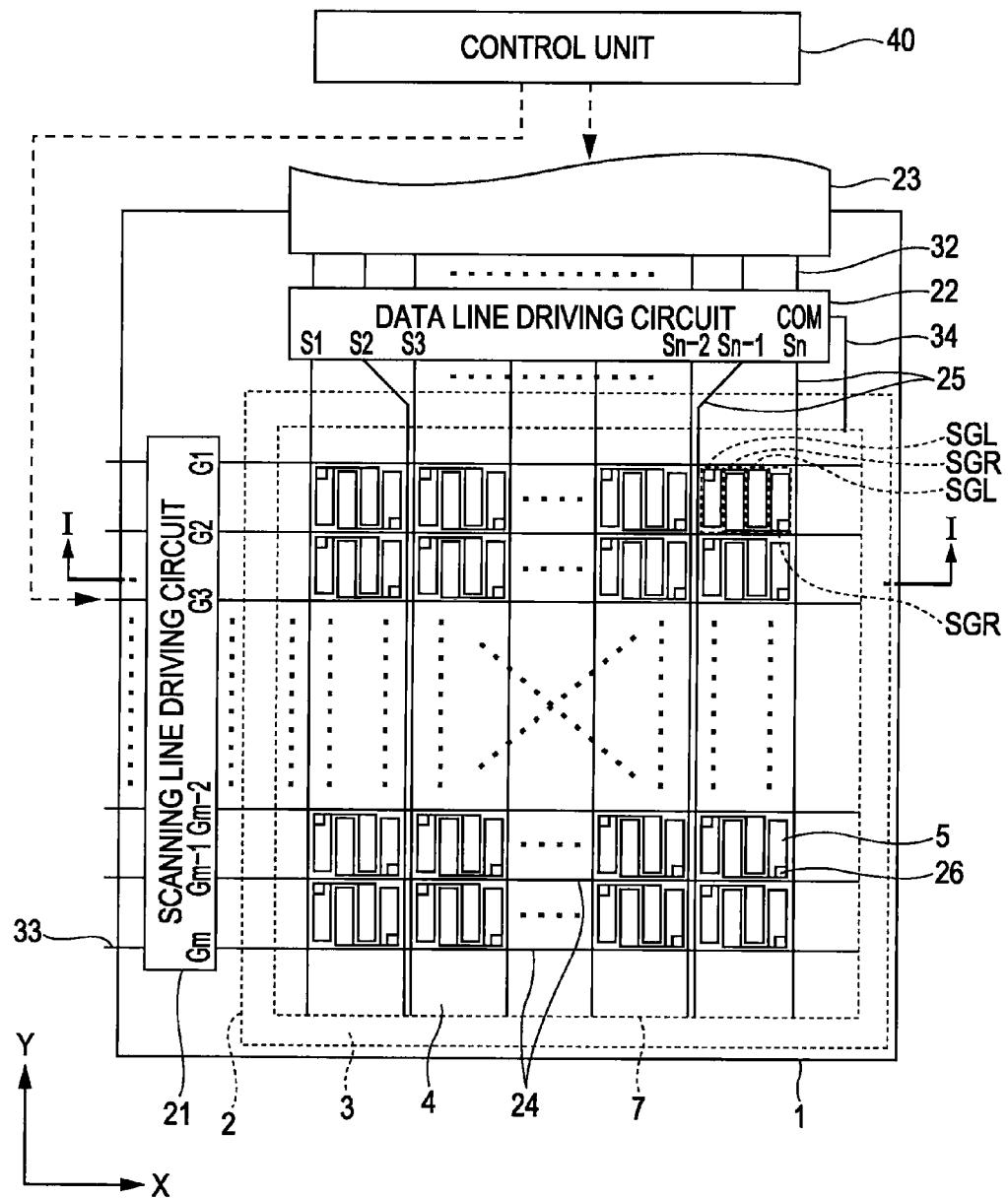
FIG. 2 is a plan view of a liquid crystal displaying panel of the liquid crystal device according to the embodiment.

Configurations of driving circuits of the liquid crystal display panel 20 will now be described. FIG. 2 is a plan view of the liquid crystal displaying panel 20 of the liquid crystal device 100 according to this embodiment. It is to be understood that FIG. 1 referred to in the foregoing description shows the liquid crystal device 100 taken along the line I-I of FIG. 2, with the driving circuits omitted. In the following description, a term "Y direction" is used to mean the lengthwise direction of the drawing sheet of FIG. 2, i.e., a column direction, while "X direction" means the crosswise direction of the drawing sheet, i.e., a line direction.

A plurality of scanning lines 24 and a plurality of data lines 25 are arranged in a matrix on the inner surface of the substrate 1. Switching elements 26 such as TFT (thin film transistor) devices are located corresponding to intersections of the scanning lines 24 and the data lines 25. Two comb-tooth-shaped pixel electrodes 5 are located in a region defined by the scanning lines 24 and the data lines 25, each of the pixel electrodes 5 being electrically connected to the switching element 26. The pixel electrode 5 is formed with the pixel electrode segments 5a and the pixel electrode segment 5b electrically connected to the pixel electrode segment 5a.

The substrate 1 has a region which extends outwardly in X direction beyond an adjacent end of the substrate 2, as well as a region which extends outwardly in Y direction beyond an adjacent end of the substrate 2. A scanning line driving circuit 21 is arranged on the inner surface of the substrate 1 in the region extending in the X direction and a data line driving circuit 22 is arranged on the inner surface of the substrate 1 in the region extending in the Y direction.

Each of the data lines 25 denoted by S1 to Sn (n is a natural number) extends in the Y direction, being arranged adjacent to one another with a predetermined interval therebetween in the X direction. The data lines 25 are electrically connected to the data line driving circuit 22 at one ends thereof. The data line driving circuit 22 is electrically connected to an FPC (flexible printed circuit) 23 via lines 32. The FPC 23 is electrically connected to external electronic apparatus and the data line driving circuit 22 receives control signals from a control unit 40 of the external electronic apparatus through the FPC 23. The data line driving circuit 22 supplies data signals to the data lines 25 denoted by S1 to Sn in accordance with the control signals.

Each of the scanning lines 24 denoted by G1 to Gm (m is a natural number) extends in the X direction, being arranged adjacent to one another with a predetermined interval therebetween in the Y direction. The scanning lines 24 are electrically connected to a scanning line driving circuit 21 at one ends thereof. The scanning line driving circuit 21 is electrically connected to lines 33 electrically connected to the external electronic apparatus. The scanning line driving circuit 21 receives the control signals from the control unit 40 of the external electronic apparatus through the lines 33. The scanning line driving circuit 21 sequentially supplies scanning signals to the scanning lines 24 denoted by G1 to Gm in accordance with the control signals.

The counter electrode 7 is electrically connected to the data line driving circuit 22 via a line 34, the line 34 being connected to a COM terminal to which a common potential (reference potential) is applied. The data line driving circuit 22 supplies driving signals through the line 34 in accordance with the control signals from the external electronic apparatus so as to drive the counter electrode 7.

The scanning line driving circuit 21, in accordance with the control signals supplied from the control unit 40, sequentially and exclusively selects the scanning lines 24 in an order from G1 to Gm and supplies the scanning signals to the selected scanning lines 24. The data line driving circuit 22 supplies data signals corresponding to display contents to the pixel electrodes 5 arranged at the positions corresponding to the selected scanning lines 24 through the data lines 25 in accordance with the control signals supplied from the control unit 40. By doing so, potentials are applied to these pixel electrodes 5 and the orientations of liquid crystal molecules of the liquid crystal 4 arranged between the pixel electrodes 5 and the counter electrode 7 are changed so that the liquid crystal display panel 20 enters a non-display mode or an intermediate-display mode to display a desired image thereon. That is, the control unit 40 supplies the control signals to the scanning line driving circuit 21 and the data line driving circuit 22 so as to control the scanning signals and the data signals supplied to the scanning lines 24 and the data lines 25, respectively, whereby a desired image can be displayed on the liquid crystal display panel 20.

Each pixel electrode segment of the subpixel SGR and each pixel electrode segment of the subpixel SGL are in an alternate arrangement. Therefore, the image observed by the viewer 11R is displayed by changing the orientation of liquid crystal molecules of the liquid crystal 4 arranged between the pixel electrodes 5 (more precisely, pixel electrode segments 5a and 5b) corresponding to the subpixel SGR and the counter electrode 7. Likewise, the image observed by the viewer 11L is displayed by changing the orientation of the liquid crystal molecules of the liquid crystal 4 arranged between the pixel electrodes 5 (more precisely, pixel electrode segments 5a and 5b) corresponding to the subpixel SGL and the counter electrode 7.

Figure 3A:
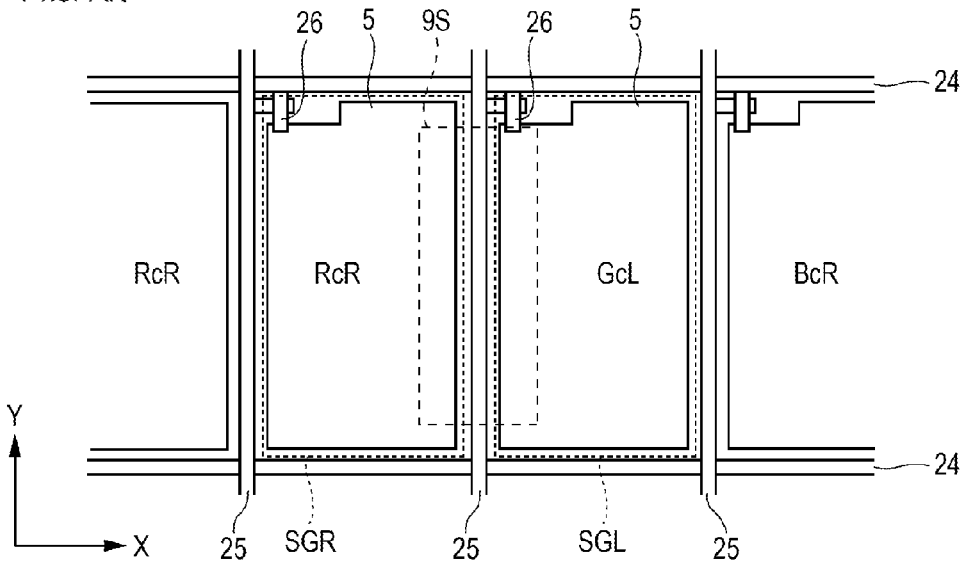
FIG. 3A is a plan view illustrating a structure of pixel electrodes of a typical liquid crystal device.
Figure 3B:
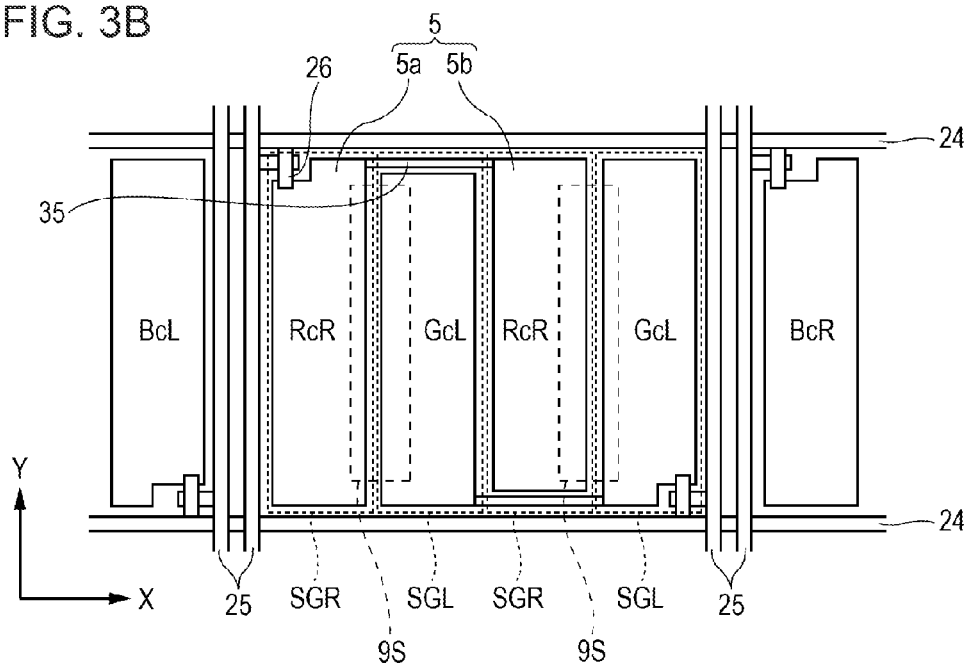
FIG. 3B is a plan view illustrating a structure of pixel electrodes of the liquid crystal device according to the embodiment.

Referring now to FIGS. 3A and 3B, a structure of the pixel electrode 5 is described in detail. FIG. 3A is a plan view illustrating structures of pixel electrodes of a typical liquid crystal device. FIG. 3B is a plan view illustrating structures of pixel electrodes of the liquid crystal device according to the embodiment. Alphabet symbols written in the pixel electrodes 5 indicate the color layer components assigned to the pixel electrodes 5.

In a typical liquid crystal device, undivided rectangular (or square) pixel electrodes 5 are arranged in the regions defined by scanning lines 24 and data lines 25, each of the pixel electrodes 5 corresponding to a single subpixel SGR or SGL, as shown in FIG. 3A. For example, the pixel electrode 5 corresponding to a color layer component RcR and the pixel electrode 5 corresponding to a color layer component GcL are arranged in respective regions defined by the scanning lines 24 and the data lines 25 as shown in FIG. 3A. As is seen from FIG. 3A, slits 9S of a parallax barrier 9 are positioned in regions corresponding to the boundaries between adjacent pixel electrodes 5.

Comparing to this known arrangement, according to the illustrated embodiment, two pixel electrodes 5, each of which divided in a comb-tooth shape, are located in the region defined by the scanning lines 24 and the data lines 25 in the liquid crystal device 100. The comb-tooth-shaped pixel electrodes 5 are arranged interdigitating with one another, whereby the subpixel SGR and the subpixel SGL are in the alternate arrangement.

Specifically, the comb-tooth-shaped pixel electrode 5 is formed with the pixel electrode segment 5a, the pixel electrode segment 5b and a line 35 interconnecting the pixel electrode segments 5a and 5b. The pixel electrode segments 5a and 5b corresponding to the color layer component RcR are arranged in the region corresponding to the subpixel SGR and the pixel electrode segments 5a and 5b corresponding to the color layer component GcL are arranged in the region corresponding to the subpixel SGL.

The pixel electrode segment 5a is deposited on a place corresponding to a point of intersection of each scanning line 24 and each data line 25, being connected to the scanning line 24 and the data line 25 via the switching element 26. The pixel electrode segment 5b is in a direct electrical connection with the pixel electrode segment 5a via the line 35. Therefore, the potential applied to the pixel electrode segment 5b is equivalent to the potential applied to the pixel electrode segment 5a which is in the direct electrical connection with the pixel electrode segment 5b. The color layer component corresponding to the pixel electrode segment 5b carries the same color as the color layer component corresponding to the pixel electrode segment 5a which is in the direct electrical connection with the pixel electrode segment 5b. For example, the pixel electrode segments 5a and 5b corresponding to the color layer component RcR is electrically connected to each other, and also the pixel electrode segments 5a and 5b corresponding to the color layer component GcL is in the direct electrical connection with each other, as shown in FIG. 3B.

The two comb-tooth-shaped pixel electrodes 5 are arranged interdigitating with one another so that the four pixel electrode segments of two pixel electrodes 5 are in the alternate arrangement, the two pixel electrodes 5 being electrically connected to the two switching elements 26, in the liquid crystal device 100 in this embodiment. That is, the subpixel SGR and the subpixel SGL are in the alternate arrangement. The slits 9S of the parallax barrier 9 are located at the positions corresponding to the boundaries between the adjacent pixel electrodes 5. More specifically, the slit 9S is arranged in two out of three regions, each of three regions being located between adjacent pixel electrode segments, excluding the central region sandwiched therebetween. The pixel electrode segments positioned at one side of either of the slits 9s are commonly connected to one switching element 26, thus forming the aforesaid "first pixel electrode", while the pixel electrode segments positioned at the other side of either of the slits 9s are commonly connected to the other switching element 26, thus forming the aforesaid "second pixel electrode".

In short, the pixel electrodes according to the liquid crystal device 100 of this embodiment is configured such that each of the two pixel electrodes in the known parallax-barrier-type liquid crystal device is divided into the pixel electrode segments, and these pixel electrode segments of both pixel electrode are arranged alternately.

(How to Display Images)

A combined image displayed by the liquid crystal device 100 is hereinafter described in detail.

Figure 4:
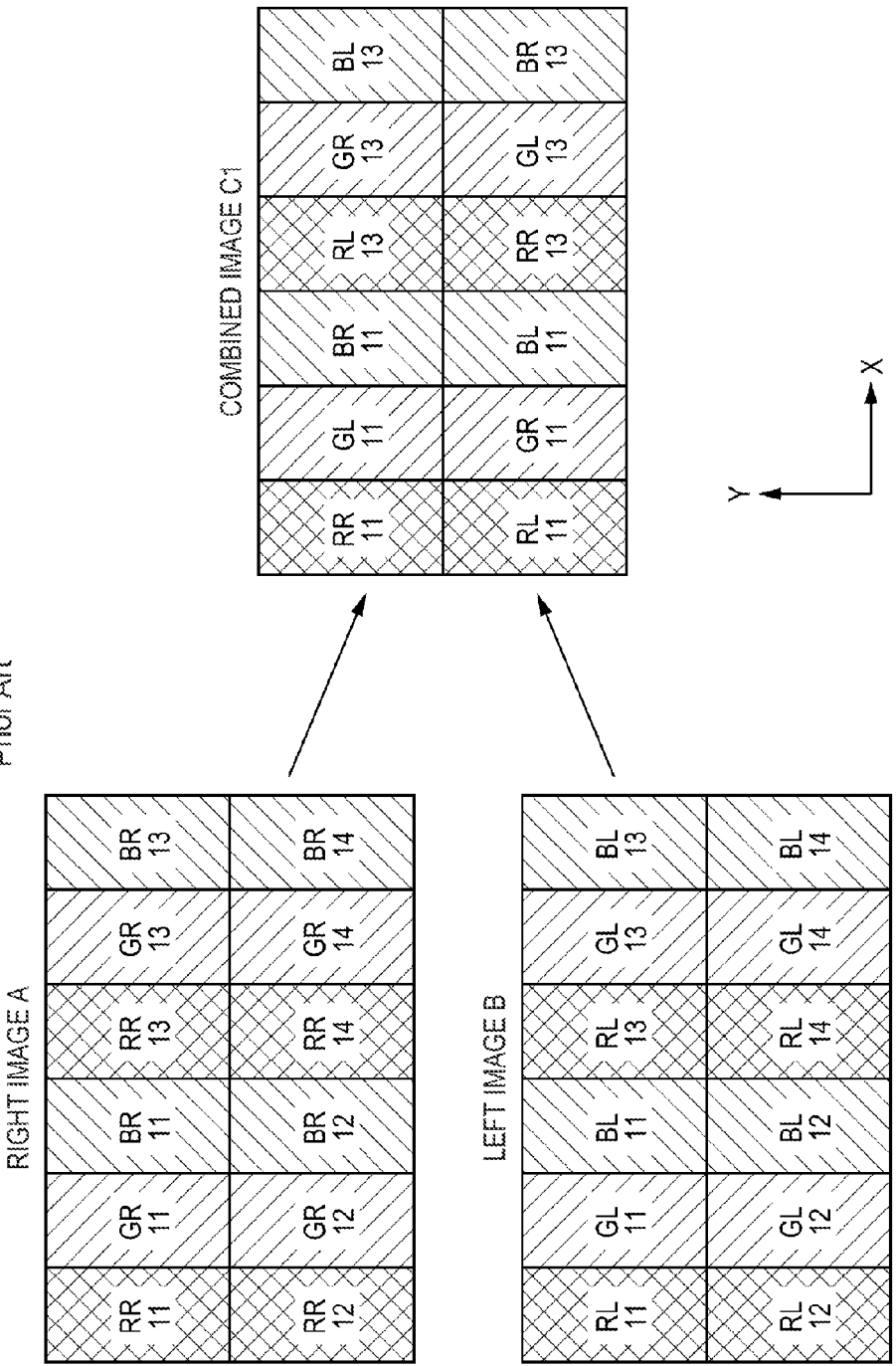
FIG. 4 is a schematic diagram illustrating a composite image formed from two images.

FIGS. 4 and 5 are schematic diagrams illustrating how to generate a combined image for display by combining a right image A and a left image B. The right image A is displayed for the viewer 11R, and the left image B is displayed for the viewer 11L. A combined image, designated at C1, is generated by combining the right image A and the left image B in the known parallax-barrier-type display device. The combined image, indicated at C2, is the image actually displayed on the liquid crystal display panel 20 of the liquid crystal device 100 of the embodiment.

The right image A is composed of unit images RR11 to RR14, GR 11 to GR14 and BR11 to BR14. The word "unit image(s)" represents a monochrome image displayed by a unit of subpixel. The first alphabetic characters of the reference characters RR, GR and BR represent red (R), green (G) and blue (B), respectively, also the second alphabetic characters of the reference characters RR, GR and BR indicate that the unit images are input image data for the right image A. The right image A includes four, first to fourth, color pixels in FIG.

4. The first color pixel is configured with the unit images RR11, GR11 and BR11. The second color pixel is configured with the unit images RR12, GR12 and BR12. The third color pixel is configured with the unit images RR13, GR13 and BR13. The fourth color pixel is configured with the unit images RR14, GR14 and BR14.

The left image B is composed of unit images RL11 to RL14, GL11 to GL14 and BL11 to BL14. The first alphabetic characters of the reference characters RL, GL and BL represent red (R), green (G) and blue (B), respectively, also the second alphabetic characters of the reference characters RL, GL and BL indicate that the unit images are input image data for the left image B. The left image B includes four, first to fourth, color pixels in FIG. 4. The first color pixel is configured with the unit images RL11, GL11 and BL11. The second color pixel is configured with the unit images RL12, GL12 and BL12. The third color pixel is configured with the unit images RL13, GL13 and BL13. The fourth color pixel is configured with the unit images RL14, GL14 and BL14.

The control unit 40 alternately combine the unit image of the right image A and the unit image of the left image B so as to generate the combined image C1 with the right image A and the left image B.

More specifically, when generating the combined image C1 with the right image A and the left image B, the control unit 40 uses the unit images of the right image A and the left image B in a plurality of predetermined lines as unit images forming the combined image C1. For instance, referring to FIG. 4, the unit images denoted by symbols with suffixes 11 and 13 of the right image A and the left image B are used as the unit images forming the combined image C1. Unit images in lines other than the plurality of predetermined lines of the right image A and the left image B are not used as the unit images constituting the combined image C1. That is, still referring to FIG. 4, the unit images denoted by symbols with suffixes 12 and 14 of the right image A and the left image B are not used as the unit images forming the combined image C1.

As is apparent from the combined image C1 shown in FIG. 4, the control unit 40 generates the combined image C1 by alternately arranging the unit images denoted by symbols with suffixes 11 and 13 of the right image A and the left image B in the matrix. It is to be appreciated that the combined image C1 is an image displayed on the typical liquid crystal device employing the parallax barrier system shown in the FIG. 3A.

The control unit 40 determines potentials to be applied to the pixel electrodes 5 corresponding to the subpixels SGR and SGL on the basis of the gray-scale levels of the unit images of the combined image C1 as described above, and then, supplies the control signals generated in accordance with the determined potentials to the scanning line driving circuit 21 and the data line driving circuit 22.

As in the case of the image C1, a combined image C2 is displayed on the liquid crystal display panel 20 of the liquid crystal device 100 of the illustrated embodiment. As described before, the pixel electrodes 5 is divided into the pixel electrode segments 5a and 5b. Therefore, each of the unit images of the combined image C2 is divided into the subpixels SGR (or the subpixels SGL), whereas each of the unit images of the combined image C1 is not. For example, referring to the upper left of FIG. 5, the two unit images RR11 and the two unit images GL11 are displayed, such that one unit image RR11 and one unit image GL11 appear alternately. Two pixel electrode segments corresponding to the subpixel SGR displaying the unit image RR11 are pixel electrode segments 5a and 5b which are electronically connected to each other, forming one comb-tooth-shaped pixel electrode 5 (hereinafter referred to as "pixel electrode 5RR"). Also, two pixel electrode segments corresponding to the subpixel SGL displaying the unit image RL11 are pixel electrode segments 5a and 5b which are electronically connected to each other, forming another comb-tooth-shaped pixel electrode 5 (hereinafter referred to as "pixel electrode 5GL"). Then, the pixel electrode segments 5RR and 5GL interdigitating with each other are arranged in one of the regions defined by the plurality of scanning lines 24 and the plurality of the data lines 25.

Locations of the slits 9S of the parallax barrier 9 are also indicated by dashed lines on the combined image C2 shown in FIG. 5. The viewer 11R only sees the unit images RR11, BR11, GR13, GR11, RR13 and BR13, when seeing the combined image C2 through the slits 9S, thereby recognizing the right image A alone. On the other hand, the viewer 11L only sees the unit images GL11, RL13, BL13, RL11, BL11 and GL13, when seeing the combined image C2 through the slits 9S, thereby recognizing the left image B alone.

(Division of the Pixel Electrode)

Figure 6A:
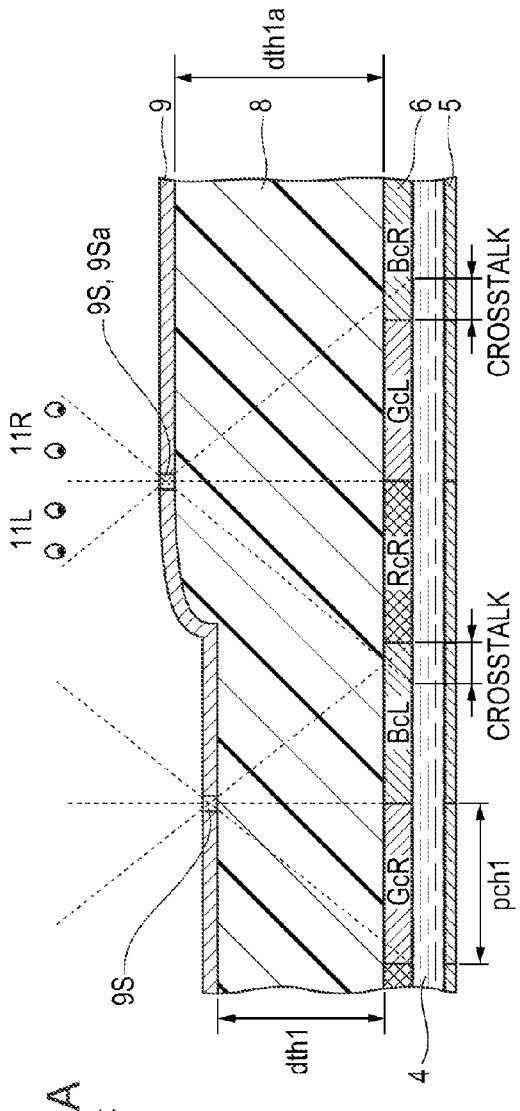
FIG. 6A is a sectional view illustrating in a greater scale a typical liquid crystal displaying panel.
Figure 6B:
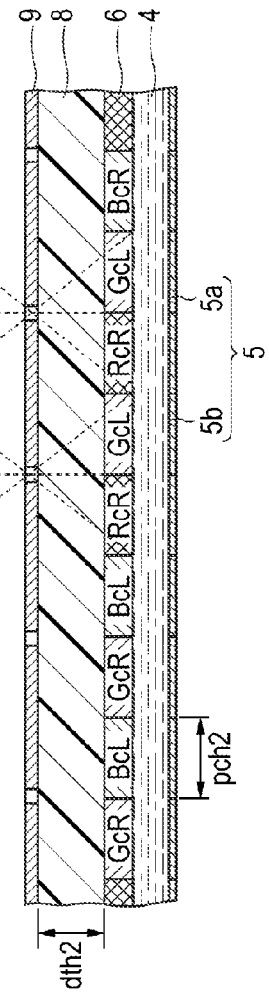
FIG. 6B is a sectional view illustrating in a greater scale the liquid crystal displaying panel according to the embodiment.

A description will now be given of a manner in which the pixel electrode is divided, with specific reference to FIGS. 6A and 6B. FIG. 6A is a sectional view illustrating in a greater scale a typical liquid crystal displaying panel. FIG. 6B is a sectional view illustrating in a greater scale the liquid crystal displaying panel 20 according to the embodiment.

The liquid crystal display panel employing the parallax barrier system has the over-coating layer 8 provided between the parallax barrier 9 and the color layer 6 so as to separate the parallax barrier 9 from the liquid crystal 4 by a predetermined distance. In this case, the thickness of the over-coating layer 8 is denoted by "dth". When a pitch at which the pixel electrodes 5 are arranged is denoted by "pch", the thickness dth of the over-coating layer is determined in order that the ratio of the thickness dth of the over-coating layer 8 to the pitch pch at which the pixel electrodes 5 are arranged, i.e. dth/pch, falls within a predetermined range. The value of dth/pch is decided on the basis of a viewing angle or the like so that the both viewers at the different viewing positions can see their desiring images. For example, dth/pch is set to be in the range of from 1.1 to 1.3. In the following description, dth/pch is set to be 1.1 as one example.

Referring to FIG. 6A, the typical liquid crystal device employing the parallax barrier system has the pitch of the arrangement of the pixel electrodes 5 pch1 of, for example, 72 μm. In such a case, the thickness of the over-coating layer 8 dth1 is determined to be 80 μm (72×1.1). The over-coating layer 8 is formed to have a constant thickness by coating an acrylic resin all over the parallax barrier 9 over a plurality of times. However, as the over-coating layer 8 becomes thicker, it becomes more difficult to form the over-coating layer 8 having the constant thickness. A preferable thickness is 20 μm or less to safely form the over-coating layer 8 having the constant thickness. Therefore, for example, when the thickness of the over-coating layer 8 dth1 is determined to be 80 μm, it is difficult to form the over-coating layer 8 with the constant thickness and, therefore, the thickness of the over-coating layer 8 tends to vary according to a position on the surface of the liquid crystal display panel. FIG. 6A exemplary illustrates that the over-coating layer 8 is formed to have the thickness dth1 at the left side of the drawing, while the over-coating layer 8 is formed to have a thickness dth1a thicker than the thickness dth1 at the right side of the drawing. In the figure, the slit 9S of the parallax barrier 9 located on a position corresponding to the over-coating layer 8 having the thickness dth1a is indicated as a slit 9Sa.

When different images are provided for the different viewers at the different viewing positions, respectively, through the slit 9Sa, not only one image for respective viewer is seen by the viewer but also part of the other image is seen by the same viewer. In other words, a crosstalk is occurring. For example, not only light passing through the color layer component GcL is incident on the eyes of the viewer 11L, but also light passing through the color layer component BcR is undesirably incident on the eyes of the viewer 11L. Likewise, not only light passing through the color layer component RcR is incident on the eyes of the viewer 11R, but also light passing through the color layer component BcL is undesirably incident on the eyes of the viewer 11R. It has been necessary to laminate four over-coating layers, each being 20 μm thick, so as to form the over-coating layer 8 of 80 μm thick.

Unlike the typical known liquid crystal device, the liquid crystal device 100 of the embodiment has the pixel electrodes 5 each of which is divided into two pixel electrode segments 5a and 5b arranged at the same pitch and having the same size as shown in FIG. 6B, and the color layer components and the slits 9S are arranged corresponding to the pixel electrode segments 5a and 5b as shown in FIG. 3. Therefore, when the pitch pch1 of the arrangement of the pixel electrodes 5 is 72 μm, the pitch pch2 of the arrangement of each of pixel electrode segments 5a and 5b is 36 μm. When the ratio of the thickness dth of the over-coating layer 8 to the pitch pch of the arrangement of the pixel electrodes 5, i.e. dth/pch, is 1.1, the thickness dph2 of the over-coating layer 8 is 40 μm (36×1.1), since the pch2 of each pixel electrode segments 5a and 5b is 36 μm. That is, the thickness dph2 of the over-coating layer 8 according to the embodiment may be as small as half of the thickness dph1 (here, 80 μm) of the over-coating layer 8 of the typical known display device. In this case, it suffices only to laminate only two over-coating layers, each being 20 μm in thickness to form the over-coating layer 8.

As is understood from the description given before, the liquid crystal device 100 of the embodiment is configured to have the pixel electrode 5 divided into pixel electrode segments 5a and 5b, and the color layer components and the slits 9S arranged corresponding to the pixel electrode segments 5a and 5b, whereby it is possible to form the over-coating layer 8 thinner than the typical liquid crystal device employing the parallax barrier system. Therefore, it is easier to form the over-coating layer 8 having a constant thickness in the liquid crystal device 100 of the embodiment comparing to the typical liquid crystal device, so that the crosstalk can be reduced.
(Modifications)

Modifications of the liquid crystal device 100 of the embodiment will be described hereafter. The pixel electrode 5 is divided into the two pixel electrode segments 5a and 5b in the embodiment described before, however, the pixel electrodes 5 may be divided into three or more pixel electrode segments. The larger the number of pixel electrode segments of the pixel electrode 5 becomes, the thinner the over-coating layer 8 can be formed, thereby leading to a stable formation of the over-coating layer 8 having a constant thickness.

The modification is configured such that the number of the pixel electrode segments divided from one pixel electrode 5 is determined in a manner in which the thickness of the over-coating layer 8 is smaller than a "predetermined value" while the ratio of the over-coating layer 8 to the pitch at which the pixel electrode segments are arranged, i.e. dth/pch, is substantially fixed. Here, the "predetermined value" is the thickness with which the over-coating layer 8 having the constant thickness can be stably formed. The predetermined value is preferably 20 μm.

For example, when the ratio of dth/pch is set to be 1.1, the pitch of the arrangement of the pixel electrode segments needs to be 18 μm (20/1.1) or less in order to set the thickness of the over-coating layer 8 smaller than or equal to 20 μm. Therefore, when the pitch of the pixel electrode 5 is 72 μm, the number of the pixel electrode segments divided from one pixel electrode 5 is determined to be four.

Figure 7:
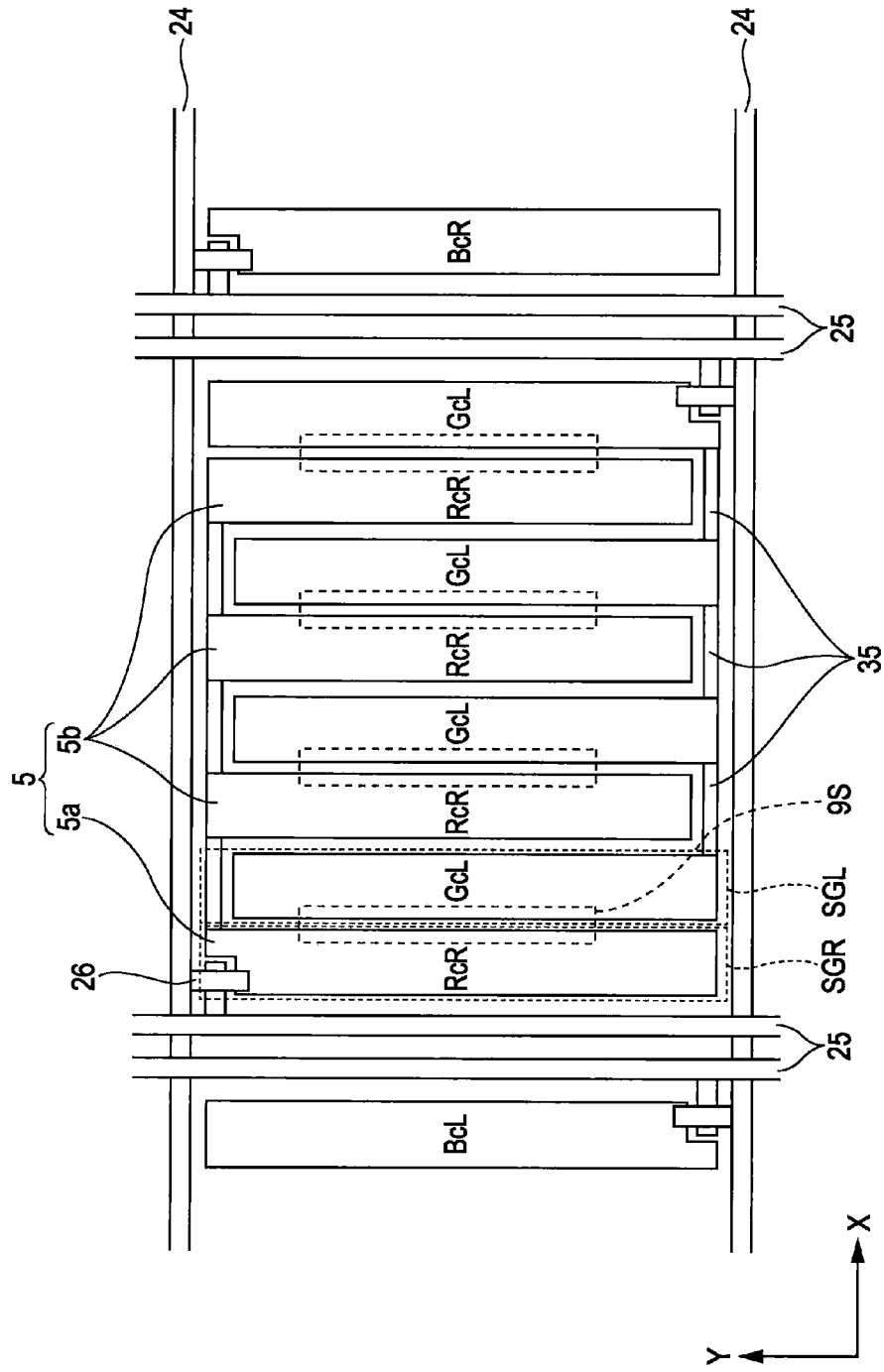
FIG. 7 is a schematic diagram illustrating a structure of the pixel electrodes of an example of a practical modification of the liquid crystal device according to the embodiment.

FIG. 7 is a plan view illustrating structures of the pixel electrode 5 divided into four pixel electrode segments. Each of the pixel electrode segments 5a and 5b are denoted by the same alphabetic characters as the color layer components corresponding thereto.

As is understood from FIG. 7, the subpixel SGR and the subpixel SGL are arranged alternately and two comb-shaped pixel electrodes 5 are arranged interdigitating with one another in each of the regions defined by the plurality of scanning lines 24 and the plurality of data lines 25, in the same way as the embodiment shown in FIG. 3. When the pixel electrode 5 is divided into four pixel electrode segments, the pixel electrode 5 is configured to have one pixel electrode segment 5a electrically connected to each scanning line 24 and each data line 25 via the switching element 26, and three other pixel electrode segments 5b electrically connected to the pixel electrode segment 5a directly via the lines 35. Therefore, potentials applied to the three pixel electrode segments 5b are the same as a potential applied to the pixel electrode segment 5a. The color of the color layer components corresponding to the three pixel electrode segments 5b is the same as the color of the color layer component corresponding to the pixel electrode segment 5a. Consequently, the subpixels SGRs (or the subpixels SGLs) corresponding to the three pixel electrode segments 5b display the same image as the image displayed on the pixel electrode segment 5a which is in a direct electrical connection with the pixel electrode segments 5b.

When the pitch of the arrangement of the pixel electrodes 5 is 54 μm, the pixel electrode 5 is divided into three pixel electrode segments likewise. Also, when the pitch of the arrangement of the pixel electrodes 5 is 36 μm, the pixel electrode 5 is divided into two pixel electrode segments. In other words, the higher the resolution of the liquid crystal device is set, the smaller the number of division is determined. Also, the lower the resolution of the liquid crystal device is set, the larger the number of division is determined. Determining the number of division of the pixel electrode 5 constantly allows the thickness of the over-coating layer 8 to be 20 μm or less.

As is understood from the description before, the modification of the liquid crystal device 100 of the illustrated embodiment is configured such that the number of the pixel electrode segments divided from one pixel electrode 5 is decided in a manner in which the thickness of the over-coating layer 8 is smaller than a "predetermined value" and the ratio of the over-coating layer 8 to the pitch of the arrangement of the pixel electrode segments, i.e. dth/pch, is substantially fixed. By doing so, the over-coating layer 8 with the constant thickness is formed stably, so that the crosstalk is safely prevented or reduced.

Figure 8:
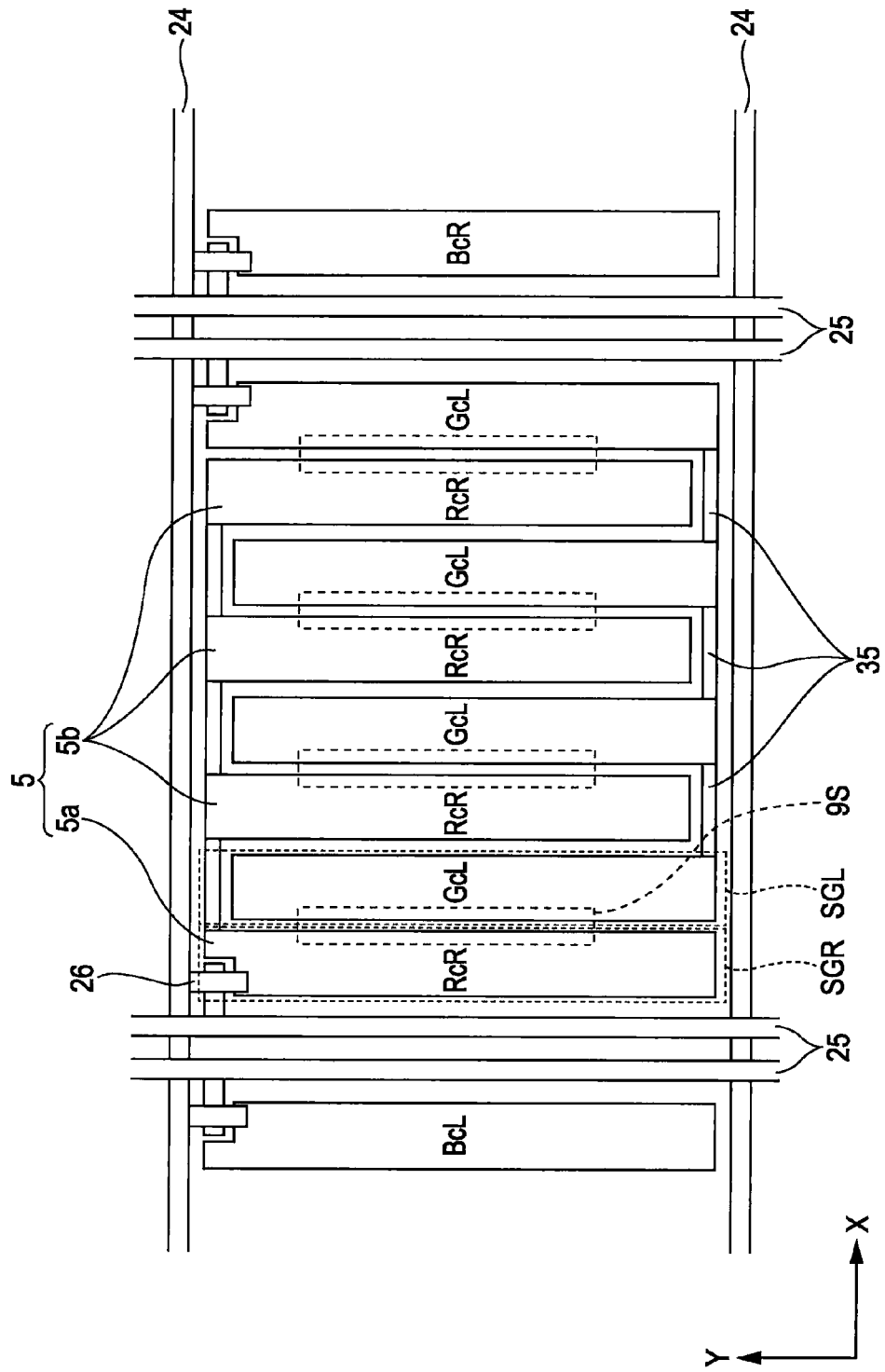
FIG. 8 is a schematic diagram illustrating a structure of the pixel electrodes of an example of a practical modification of the liquid crystal device according to the embodiment.

The subpixels including the two pixel electrodes 5 located in one defined region display two colors different from one another in the embodiment described before, however, the subpixels including two pixel electrodes 5 located in the defined region may display the same color. For instance, by forming as described above, arranging the color layer components is facilitated because only one color layer component may be placed over the defined region without placing two colors of the color layer components alternately, even though each color layer component is arranged corresponding to each pixel electrode 5. The liquid crystal device according to the embodiment are configured such that two switching elements 26 of one defined region are placed corresponding to points of intersection of the scanning lines 24 and the data lines 25. One switching element 26 is arranged on one point of intersection of one scanning line 24 and one data line 25, and the other switching element 26 is arranged on the other point of intersection where the other scanning line 24 and the other data line 25 interect each other, as shown in FIG. 7. This arrangement, however, is not exclusive. Alternatively, as shown in FIG. 8, two switching elements 26 of the one defined region may be placed in such a manner that one switching elements 26 is arranged on the point of intersection between one scanning line 24 and one data line 25, while the other switching element 26 being arranged on the same scanning line 24 and the other data line 25.

Also, the liquid crystal device according to the illustrated embodiment is configured such that the parallax barrier 9 is placed on a side adjacent to the inner surface of the substrate 2. This arrangement also is illustrative. Alternatively, the parallax barrier 9 may be placed on a side opposite to the inner surface of the substrate 2. Liquid crystal devices, in which the present invention can be employed, include the liquid crystal device configured such that the light emitted from the lighting unit 10 enters and passes through the liquid crystal display panel 20 from the substrate 1 and leaves the substrate 2 to be seen by viewers observing the liquid crystal display panel 20 as shown in FIG. 1, as well as the liquid crystal device configured such that the locations between the substrate 1 and the substrate 2 are reversed from the above-described configuration. More specifically, the present invention can be employed in a liquid crystal device configured so that the light emitted from the lighting unit 10 enters and passes through the liquid crystal display panel 20 from the substrate 2 on which the color layer 6 is formed to be seen by the viewers observing the liquid crystal display panel from the side adjacent to the substrate 1.

In the parallax barrier type liquid crystal device of the embodiment, the pixel electrode 5 is divided into the pixel electrode segments 5a and 5b . The described embodiment, however, can be used in other types of display device. For example, the liquid crystal device may employ a lenticular lens instead of the parallax barrier. Dividing pixel electrode into pixel electrode segments allows the liquid crystal device employing the lenticular lens which is capable of two-screen display or three-dimensional image display to obtain a similar advantage as the liquid crystal device of the embodiment.

The present invention may be employed in not only the liquid crystal devices, but also electro-optics devices including organic electroluminescence devices, inorganic electroluminescence devices, plasma display devices, electrophoresis display devices, and field emission display devices. In the organic electroluminescence devices, not having the color layer, the over-coating layer is formed between an electro-optic material and the parallax barrier.

Many modifications and variations are possible without fundamentally deviating from the essence of the present invention.

(Electronic Apparatus)

An example of an electronic apparatus in which the liquid crystal device 100 according to the embodiment can be employed will be now described with reference to FIG. 9.

Figure 9A:
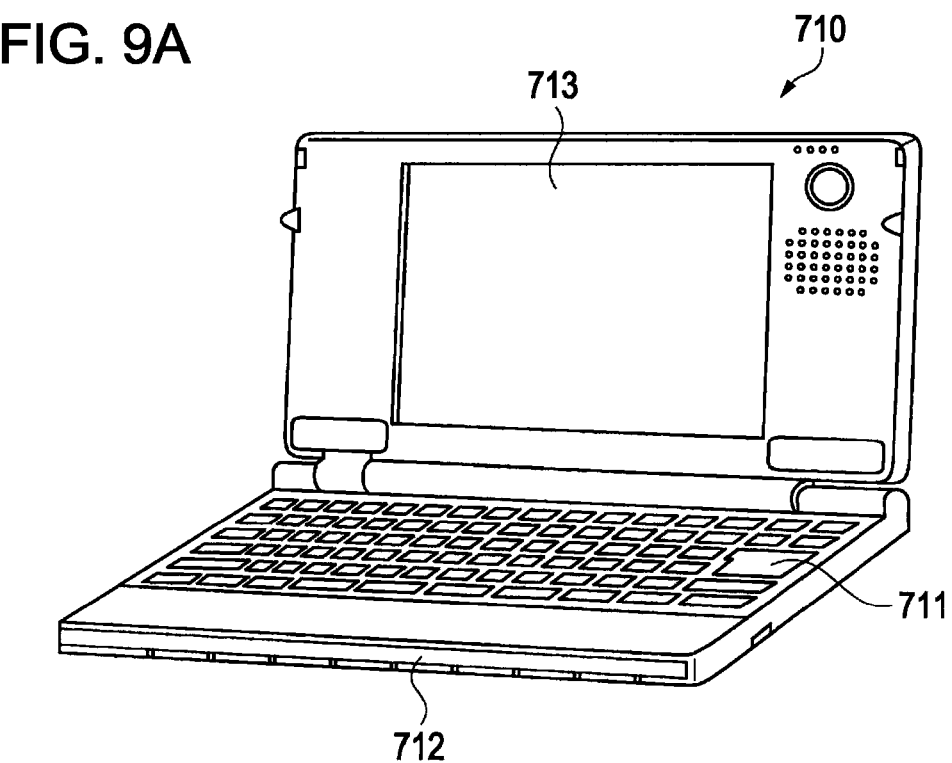
FIG. 9A illustrates an example of an electronic apparatus to which a visual display unit of the embodiment is applied.

A portable personal computer (a so-called laptop computer) will be described, in which the liquid crystal device 100 is employed as a display unit thereof. FIG. 9A is a perspective view illustrating a structure of the personal computer. As shown in FIG. 9A, a personal computer 710 includes a body 712 having a keyboard 711 and a display unit in which the liquid crystal device 100 is used as a panel.

The liquid crystal device 100 is suitably employed in a display unit of a liquid crystal TV or a car navigation device. For example, when the liquid crystal device 100 is employed in the display unit of the car navigation device, the display unit may display an image of a map for a viewer sitting on a driver seat and display video images such as a movie for a viewer sitting on a passenger seat.

Figure 9B:
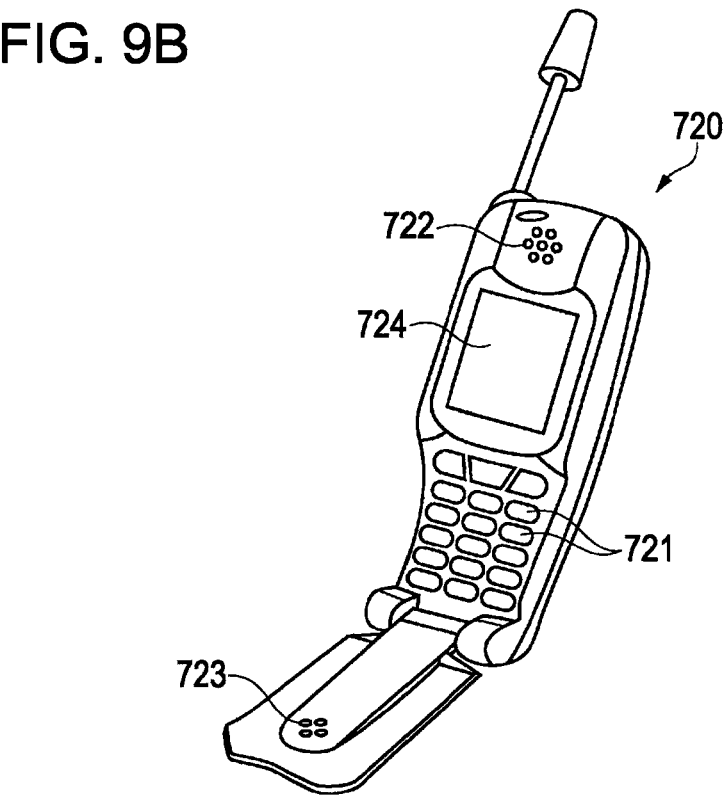
FIG. 9B illustrates an example of the electronic apparatus to which the visual display unit of the embodiment is applied.

A cellular phone will be described, in which the liquid crystal device 100 is employed as a display unit thereof. FIG. 9B is a perspective view illustrating a structure of the cellular phone. As shown in FIG. 9B, a cell phone 720 includes a plurality of operation buttons 721, an ear piece 722, a mouth piece 723 and a display unit 724 in which the liquid crystal device 100 is employed.

Additionally, the examples of the electronic apparatus in which the liquid crystal device 100 is employed may include not only the personal computer described in FIG. 9A and the cellular phone described in FIG. 9B, but also the liquid crystal TVs, video-tape recorders having a viewfinder or a monitor directly viewed by a user, the car navigation devices, pagers, electronic personal organizers, calculators, word processors, work stations, video phones, POS (point of sales) terminals, and digital still cameras.

The entire disclosure of Japanese Patent Applications Nos 2008-082824, filed Mar. 27, 2008 and 2008-189450, filed Jul. 23, 2008 are expressly incorporated by reference herein.

What is claimed is:

1. An electro-optical device comprising:
   first display elements each divided into at least a first region and a second region, second display elements each divided into at least a third region and a fourth region, and the first display elements and the second display elements being arranged such that each third region is disposed between the first region and the second region of the adjacent first display element and each second region is disposed between the third region and the fourth region of the adjacent second display element;
   a parallax barrier provided on a side of the first display elements and the second display elements adjacent to a viewer, the parallax barrier having light transmitting regions at positions thereof corresponding to boundaries between adjoining first and third regions as well as between adjoining second and fourth regions; and
   a spacer layer separating the first display elements and the second display elements from the parallax barrier, wherein
   the first region and the second region are electrically connected to each other so as to be supplied with a first voltage corresponding to a first image through a first switching element from a first data line, and both the first region and the second region display the first image,
   the first region and the second region are positioned at one side of the first data line without any other data lines intervening therebetween, and
   the third region and the fourth region are electrically connected to each other so as to be supplied with a second voltage corresponding to a second image, and both the third region and the fourth region display the second image that is different from the first image.

2. The electro-optical device according to claim 1, wherein each of the first display elements includes a first pixel electrode which is divided into a first pixel electrode segment and a second pixel electrode segment corresponding to the first region and the second region, respectively, the second pixel electrode segment being connected to the first pixel electrode segment via a first line;

each of the second display elements includes a second pixel electrode which is divided into a third pixel electrode segment and a fourth pixel electrode segment corresponding to the third region and the fourth region, respectively, the fourth pixel electrode segment being connected to the third pixel electrode segment via a second line; and the first line and the second line do not contribute to display the first and second images.

3. The electro-optical device according to claim 2, wherein the first line does not intersect the second line.

4. The electro-optical, device according to claim 2, wherein
the first line is disposed perpendicular to the other data lines and along an edge of the third region,
the second line is disposed perpendicular to the other data lines and along an edge of the second region, and
the first line does not intersect the second line.

5. The electro-optical device according to claim 1, wherein
the second voltage corresponding to the second image is supplied through a second switching element from a second data line, and
the third region and the fourth region are positioned at one side of the second data line without any other data lines intervening therebetween.

6. The electro-optical device according to claim 5, wherein the first region, the second region, the third region and the fourth region are disposed between the first data line and the second data line in a perpendicular direction perpendicular to a plane of the first region, the second region, the third region and the fourth region.

7. The electro-optical device according to claim 6, wherein the first data line and the second data line are adjacent to the other data lines.

8. An electro-optical device comprising:
a base that includes a first switching element, a second switching element, and a first data line;
a parallax barrier that is disposed above a plane of the base and that has a first light transmitting region and a second light transmitting region;
a first pixel electrode that is disposed above the plane of the base;
a second pixel electrode that is disposed above the plane of the base;
a third pixel electrode that is disposed above the plane of the base; and
a fourth pixel electrode that is disposed above the plane of the base, wherein
the first pixel electrode, the second pixel electrode, the third pixel electrode, and the fourth pixel electrode are disposed between the parallax barrier and the plane of the base,
a first voltage corresponding to a first data signal supplied through the first switching element from the first data line applied to the first pixel electrode and the second pixel electrode,
a second voltage corresponding to a second data signal supplied through the second switching element is applied to the third pixel electrode and the fourth pixel electrode,
the first pixel electrode and the second pixel electrode are positioned at one side of the first data line without any other data lines intervening therebetween, the third pixel electrode is disposed between the first pixel electrode and the second pixel electrode,
the second pixel electrode is disposed between the third pixel electrode and the fourth pixel electrode,
the first light transmitting region overlaps with a first space between the first pixel electrode and the third pixel electrode when viewed from a first direction perpendicular to the plane of the base, and
the second light transmitting region overlaps with a second space between the second pixel electrode and the fourth pixel electrode when viewed from the first direction.

9. The electro-optical device according to claim 8, wherein a formula $1.1 \leqq dth/pch \leqq 1.3$ holds, when dth stands for a thickness of a spacer layer that separating the first pixel electrode, the second pixel electrode, the third pixel electrode and the fourth pixel electrode from the parallax barrier, and pch stands for a first pitch at which adjoining the first pixel electrode and the third pixel electrode are arranged or for a second pitch at which adjoining the second pixel electrode and the fourth pixel electrode are arranged.

10. The electro-optical device according to claim 8, wherein
the first light transmitting region and the second light transmitting region are slits provided along boundaries between adjoining the first pixel electrode and the third pixel electrode as well as between adjoining the second pixel electrode and the fourth pixel electrode.

11. The electro-optical device according to claim 8, further comprising:
a substrate on which the parallax barrier and a spacer layer that separates the first pixel electrode, the second pixel electrode, the third pixel electrode and the fourth pixel electrode from the parallax barrier are laminated; and
an electro-optical material being provided between the substrate and the plane of the base.

12. The electro-optical device according to claim 11, further comprising a color layer formed on the substrate.

13. The electro-optical device according to claim 8, further comprising a lighting unit emitting light toward the base.

14. An electronic apparatus comprising the electro-optical device according to claim 8.

15. The electro-optical device according to claim 8, wherein
the first light transmitting region overlaps with the first pixel electrode and the third pixel electrode when viewed from the first direction, and
the second light transmitting region overlaps with the second pixel electrode and the fourth pixel electrode when viewed from the first direction.

16. The electro-optical device according to claim 8, wherein
the base includes second data line,
the first data signal is supplied through the first switching element and the first data line, and
the second data signal is supplied through the second switching element and the second data line.

17. The electro-optical device according to claim 8, wherein
the first data signal is used for setting a brightness of a first color of a first sub-pixel corresponding to the first pixel electrode, and
the second data signal is used for setting a brightness of a second color of a second sub-pixel corresponding to the third pixel electrode.

18. The electro-optical device according to claim 8, further comprising a second data line, wherein the third pixel electrode and the fourth pixel electrode are positioned at one side of the second data line without any other data lines intervening therebetween.

19. The electro-optical device according to claim 18, wherein the first pixel electrode, the second pixel electrode, the third pixel electrode, and the fourth pixel electrode are disposed between the first data like and the second data line in a perpendicular direction perpendicular to the plane of the base.

20. The electro-optical device according to claim 19, wherein the first data line and the second data line are adjacent to the other data lines.

21. The electro-optical device according to claim 8, wherein the second pixel electrode is connected to the first pixel electrode via a first line, and the fourth pixel electrode is connected to the third pixel electrode via a second line.

22. The electro-optical device according to claim 21, wherein the first line does not intersect the second line.

23. The electro-optical device according to claim 21, wherein the first line is disposed perpendicular to the other data lines and along an edge of the third pixel electrode, the second line is disposed perpendicular to the other data lines and along an edge of the second pixel electrode, and the first line does not intersect the second line.

24. An electro-optical device comprising:

a base that includes a first data line, a first switching element and a second switching element;

a parallax barrier that is disposed above a plane of the base and that has a first light transmitting region and a second light transmitting region;

a first pixel electrode that is disposed above a plane of the base;

a second pixel electrode that is disposed above the plane of the base;

a third pixel electrode that is disposed above the plane of the base;

a fourth pixel electrode that is disposed above the plane of the base, the first pixel electrode, the second pixel electrode, the third pixel electrode, and the fourth pixel electrode that are disposed between the parallax barrier and the plane of the base;

a first voltage corresponding to a first data signal supplied through the first switching element being applied to the first pixel electrode and the second pixel electrode; and a second voltage corresponding to a second data signal supplied through the second switching element being applied to the third pixel electrode and the fourth pixel electrode, wherein the first pixel electrode and the second pixel electrode are positioned at one side of the first data line without any other data lines intervening therebetween, the third pixel electrode is disposed between the first pixel electrode and the second pixel electrode, the second pixel electrode is disposed between the third pixel electrode and the fourth pixel electrode, the first light transmitting region is disposed at a first position corresponding to a first space between the first pixel electrode and the third pixel electrode when viewed from a first direction perpendicular to the plane of the base, and the second light transmitting region is disposed at a second position corresponding to a second space between the second pixel electrode and the fourth pixel electrode when viewed from the first direction.

25. The electro-optical device according to claim 24, wherein the base further includes a second data line, the second voltage corresponding to the second data signal is supplied through the second switching element from the second data line, and the third electrode and the fourth electrode are positioned at one side of the second data line without any other data lines intervening therebetween.

26. The electro-optical device according to claim 25, wherein the first pixel electrode, the second pixel electrode, the third pixel electrode, and the fourth pixel electrode are disposed between the first data line and the second data line in a perpendicular direction perpendicular to the plane of the base.

27. The electro-optical device according to claim 26, wherein the first data line and the second data line are adjacent to the other data lines.

* * * * *